United States Patent [19]

Kellerwessel et al.

[11] 4,119,699
[45] Oct. 10, 1978

[54] METHOD FOR WET METALLURGICAL PROCESSES

[75] Inventors: Hans Kellerwessel, Aachen, Germany; Ernst Kausel, Lima, Peru; Reinhard Nissen, Cologne, Germany

[73] Assignee: Klöckner-Humboldt-Deutz Aktiengesellschaft, Germany

[21] Appl. No.: 709,922

[22] Filed: Jul. 29, 1976

[30] Foreign Application Priority Data

Jul. 29, 1975 [DE] Fed. Rep. of Germany ....... 2533755

[51] Int. Cl.$^2$ .......................... C01G 9/06; C22B 3/02; C22B 5/00
[52] U.S. Cl. ......................... 423/109; 423/1; 423/658.5; 423/571; 75/101 R; 75/108; 75/120; 241/15; 241/29; 241/175; 266/170; 422/209; 422/262
[58] Field of Search ............... 423/1, 658.5, 659, 571, 423/109; 75/101 R, 108; 241/15, 29, 30, 175; 259/72, 75, 76; 261/1, 81; 23/267 C, 290

[56] References Cited

U.S. PATENT DOCUMENTS

| 1,570,777 | 1/1926 | Pike | 75/104 |
| 3,484,201 | 12/1969 | Landucci | 423/571 |

Primary Examiner—Brian Hearn
Attorney, Agent, or Firm—Hill, Gross, Simpson, Van Santen, Steadman, Chiara & Simpson

[57] ABSTRACT

A reactant gas is mixed intimately with a liquid and/or particulate solution in a pressurized container and agitated with high energy. Mixing occurs initially by spraying the liquid and gas together to form an emulsion with great surface contact between the reactants, and the emulsion mix is improved and maintained by agitating in the container. The container is carried on oscillatable supports and is driven by an imbalance drive for vertical oscillation in any of several configurations. Loose mixing balls or bodies are optionally carried in the container to increase the agitation and to grind solid particles carried into the solution. The grinding bodies also source protective reaction-deposited layers from the solid particles to speed the reaction. Pressure and temperature of the process is readily controlled.

6 Claims, 5 Drawing Figures

METHOD FOR WET METALLURGICAL PROCESSES

BACKGROUND OF THE INVENTION

The invention relates to a wet metallurgical process using at least one gaseous reactant and a closed system.

Wet metallurgical processes play an important part in the processing of ores for recovery of metals. The steps of the process including mixing, suspending, grinding, reacting as well as material- and heat-exchange of solid, liquid, and gaseous phases with one another.

A combination of these steps produces precipitation of metals, as for example copper or nickel by means of hydrogen, for example according to the equation:

$$Cu^{2+} + H_2 \rightarrow Cu^\circ \downarrow + 2H^+$$

The precipitation of a metal salt progresses for example according to the reaction equation:

$$H_2S + Cu^+ \rightarrow Cu_2S \downarrow + 2H^+$$

Of importance also are further oxidation procedures which progress for example according to one of the following equations:

$$2H^+ + Fe^2 + \tfrac{1}{2}O_2 \rightarrow Fe^{3+} + H_2O$$

$$ZnS + H_2SO_4 + \tfrac{1}{2}O_2 \rightarrow ZnSO_4 + S^\circ \downarrow + H_2O$$

Frequently also metallurgical processes include solution reactions of which the following is an example:

$$ZnO + H_2SO_4 \rightarrow ZnSO_4 + H_2O$$

In some of these processes, pressures of 10 to 100 atmospheres are used as well as high temperatures. A primary problem in carrying out such methods resides in bringing reactants of different phases into intimate contact. For example in oxidation reactions, the speed of diffusion of the gas (oxygen) through the liquid is the speed-determining factor for progress of the reaction. This is true also for the diffusion of hydrogen gas in precipitation procedures or for mixing- or reduction-gases in reduction procedures.

The German Laid Out Specification No. 1,038,762 discloses use of a pulsating agitation for the lixiviation of sulfidic ores. An electromagnetic driving system is disclosed as well as an agitating member of corrosion-resistant material. System cost is substantial and the device furthermore is relatively delicate or sensitive for such a rough operation. Thus the disclosed device is not entirely satisfactory.

Another agitation device for pressure-lixiviation, developed by the firm of Sherrit-Gordon, divides the oxygen in large, temperizable agitating-autoclaves by means of propellers in the electrolyte. This procedure depends upon the speed of rotation of the propeller and is therefore limited. Another method for the smelting of complex sulfidic ores by a wet method suggested in the German Pat. No. 888,929 includes guiding the stream of oxygen in circulation through the ore-suspension.

Also known for use in the lixiviation of copper-grit-concentrates is a vessel filled with steel balls, whereby the balls are moved by means of a central agitator assembly. A gas introduced through the agitator assembly into the electrolytes is divided very finely. Such device has high power requirement, correspondingly heavy wear, and relatively low output, preventing application on a large scale.

The so-called Pachuca-tank is known for an agitation-lixiviation process, in which a gas/liquid-reaction takes place. In the impeller-agitating assembly of the tank, an agitator is arranged in a central conducting pipe which causes a mixture of the gas with the liquid.

None of the known apparatus are qualitatively or quantitatively satisfactory for use at high pressures and-/or high temperatures.

Some electrochemical reactions present other difficulties, as for example in the depositing of copper from copper sulphate by means of electron-exchange with iron. During the reaction, layers form on the reactants which hinder the diffusion steps, or in extreme cases stop the reaction entirely.

Reaction-grinding is known for overcoming this difficulty, for example in a ball mill. By allowing leaching of liquid into the solid material, appreciably shorter grinding periods are required for any desired degree of grinding. In lixiviation processes the times are also appreciably decreased, because by means of the grinding fresh, reactionable surfaces are exposed to contact with the liquid solvent.

Bodies or balls used for their catalytic effect are suggest in the German Laid Out Specification No. 1,203,746. More intensive reactions are achieved for example, if iron is added as a ferro- or ferri-combination. No such metallurgical processes are known to have been employed by which a gas is reacted with solid any/or liquid phase reactants. In this connection, the rate of passing of a gas into a liquid in solution or suspension therewith determines the speed of the reaction.

Several principles are known in the art to bring gases and liquid into solution and to speed their reactions with substances dissolved or finely distributed in the liquid. The gas present may be finely distributed as an emulsion in the liquid to have form as large a surface as possible between the phases. An increase in pressure will increase the solubility and decrease the gas volume in the liquid. Third, an increase in temperature reduces solubility of the gas in the liquid and increases the reaction speed of the dissolved or finely distributed solid substances with the gas.

All known systems which attempt to mix gases intimately with a liquid by spraying or stirring are only partly satisfactory. The spraying of gases is limited in effectiveness by a low intermixing effect; in addition the size of the gas bubbles is dependent on the cross-section of the nozzles and the spraying pressure. Also with a stirring system, the mixing effect of the gas with the liquid is limited by occurrence of a suction-funnel about the stirrer, so an increase in the speed of stirring above a certain limit no longer improves the distribution of gas.

The object serving as basis for the invention is to improve upon the known methods for carrying out wet metallurgical processes. It is particularly sought to make possible, through a simple apparatus without size or sealing problems, the use of high pressures and/or temperatures.

SUMMARY OF THE INVENTION

For the intimate mixing of gas in a liquid, a container having a horizontal axis is set into energetic oscillations at a frequency above 15 Hertz and at an amplitude greater than 8 mm in a plane perpendicular to the horizontal axis. Approximately circular oscillations, whereby the container axis describes [essentially the sleeve surface of a horizontal cylinder,] approximately elliptical oscillations, whereby the container axis describes substantially the peripheral surface of a horizontally disposed body with an elliptical cross-section, or approximately linear oscillations, whereby the movement of the container axis takes place substantially along a vertical plane, may be employed. A particularly favorable, intensive agitating effect is obtained by use in a container of freely movable mixing bodies. These amplify and transfer the oscillation impulses to the liquid and produce at their edges and surfaces spatially-separated increases in speed and turbulence of the liquid. The mixing bodies also serve as grinding bodies for comminuting solids.

A continuous comminution operation prevents coating the solid surfaces with protective layers, either a gas layer, as with zinc-lixiviation, or a liquid sulphur coating as in the case of the lixiviation of sulfidic ores.

The mixing- or grinding-bodies may consist, for instance of ceramic material if they are not to take part in the reaction.

Conducting a comminution operation while at the same time emulsifying together the gaseous and liquid phases of the reaction mixture develops a result going far beyond the sum of the two processes individually.

In a further development of the method according to the invention, the process begins with low pressure and/or temperature and progresses to high pressures and/or temperatures. Depending on the types of processes suitable, the wet-metallurgical process may be carried out in batches or continuously.

It is preferable to carry out the process according to the invention in steps, first in an oscillating container and then in a second, settling container connected in series. In the settling container, activated suspensions consisting of reactive gases and/or solid substances which were produced in the oscillating container will react further with the liquid. The reaction vessel may consist of simple pressure pipe, agitation-containers, auto-claves, or other simple containers. It is essential that the gas be prevented from separating from the suspension at least until the reaction ceases by consumption either of the reactive gas or of a reactive solid dissolved or finely distributed in the liquid. Thus, connection of several oscillating containers with a still reaction container, permits reaction products to be carried away continuously depending on the concentrations of the various reactants. Compared with lixiviation processes according to conventional techniques, the times for the total reaction are appreciably diminished, because fresh, reactable solid surfaces are brought into contact with activated gas/liquid emulsion or solution through repetition of the comminution-and emulsifying-operations.

An apparatus for carrying out the method according to the invention comprises a container with a horizontal axis and an oscillatable support, the support being set into oscillation by an imbalance- or eccentric-drive. Such a container may have a round, polygonal, on ellipsoidal cross-section. The oscillating container may also be a conventional ball-mill.

The container may also conventionally be provided with a heating or cooling device in or adjacent to a container wall.

In many cases it may be necessary for the prevention of damage from corrosion that the container be lined with corrosion-resistant material.

An apparatus for carrying out the method in batches is also characterized by the connection in series of at least one ball mill with each resting reaction vessel.

In metallurgical and chemical technology, there results from the described method a great number of possibilities of utilization. Reactive gases especially suited for use include $O_2$, $H_2$, $SO_2$, $Cl_2$, $NO_2$, $CO$, as well as gas mixtures such as air. Liquids used in the hydro-or wet-metallurgical recovery of metals include aqueous solvents such as mineral or liquid ion-exchangers such as acids of minerals of an inorganic or organic nature, inorganic salt solutions, and even organic solvents and basic lyes. Solid substances which are leachable, include raw, prepared or also metallurgically pretreated ores, as well as metallurgical intermediary products as slags, stone, bell or gun metal, flying or fine dust, sublimate, or precipitation products. For example, direct treatment of sulfidic mineral substances may be undertaken without previous roasting or calcination and, accordingly, without conversion of the sulphur into the gas form or into metal-sulfate. The metals by means of leaching or electrolysis are brought directly into solution, while the sulphur is recovered as elementarily as possible. This process is not only economically favorable, but by avoidance of production of gaseous sulphur combinations and related dusts, is particularly favorable to the environment.

DESCRIPTION OF THE PREFFERED EMBODIMENTS

Figure 1:
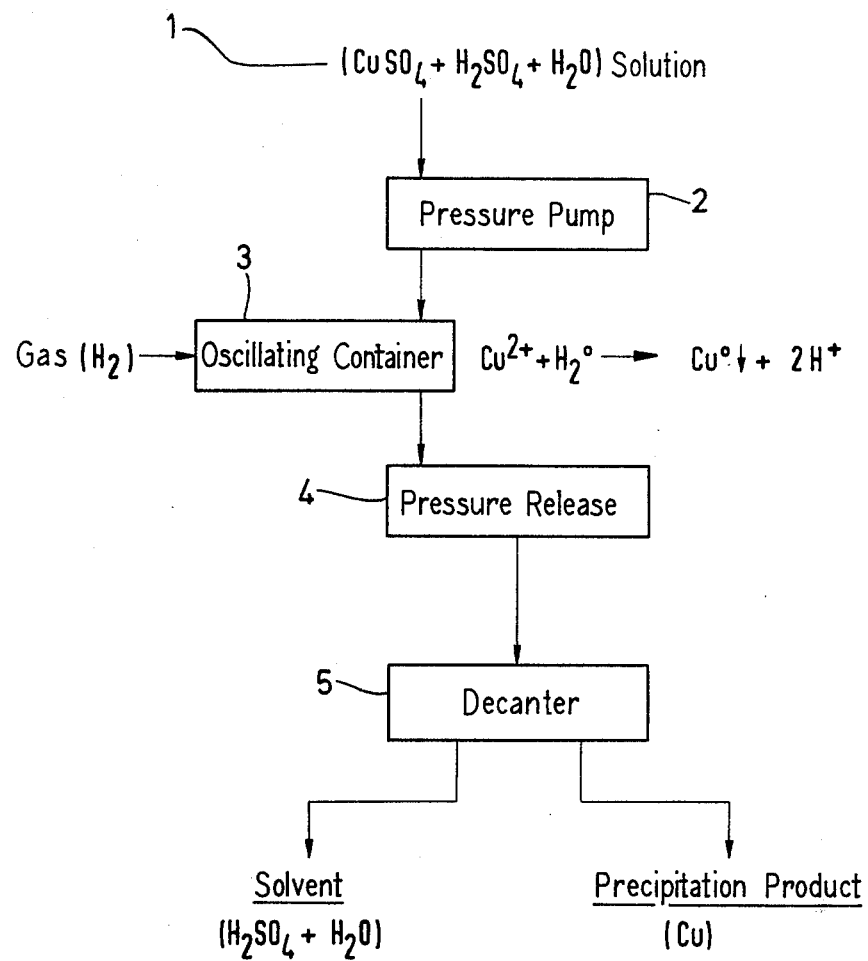
FIG. 1 is a flow diagram for precipitation of metal from a salt-solution by hydrogen gas.

FIG. 1 shows in flow-diagram form the supply of a solution 1 consisting of copper sulphate, sulphuric acid and water. A pressure pump 2 sprays solution 1 with an increased pressure of 10 atmospheres into an oscillating container 3. Hydrogen gas under pressure is sprayed into the oscillating container 3, whereby the precipitation process according to the formula indicated in the Figure occurs. The oscillating container 3 undergoes a very intensively energetic oscillation imparted by an imbalance drive, [not shown,] at operating, for example, $16\frac{2}{3}$ Hertz and at an amplitude of 10 mm. The liquid and gas sprays into the container 3 are so intensive that an emulsion-type mixture of both phases results and is maintained by the oscillations. The intimate intermixture of the gaseous hydrogen with the liquid solution permits a reaction of high efficiency and surprisingly great speed, whereby a continuous and economical precipitation is achieved. From the oscillating container, the reaction product flows to a pressure release vessel 4 which lowers the pressure from the oscillating container pressure to atmospheric pressure. From there, the liquid mixture flows into a decanter 5, which thickens the precipitation product Cu into a slurry while passing off the solvent $H_2SO_4$ and water for reuse. The discharged copper slurry may further be dehydrated by conventional filtration and subjected to further known metallurgical refining processes.

Figure 2:
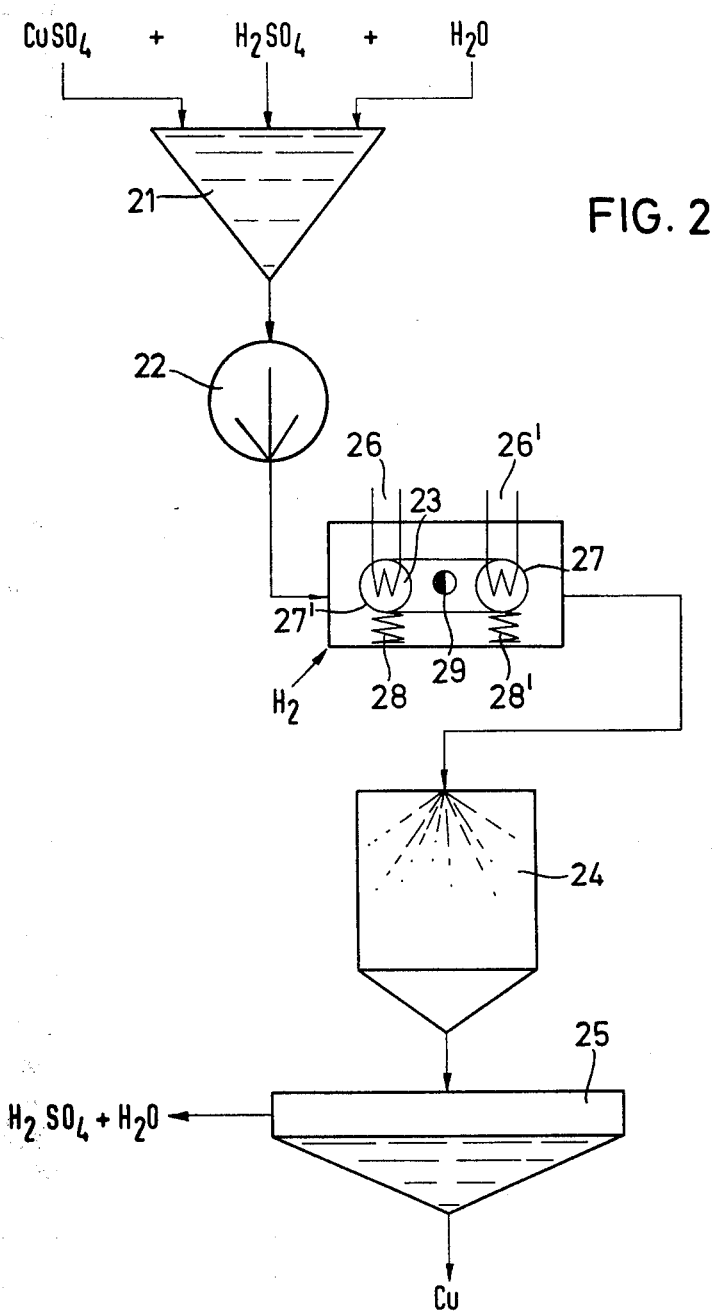
FIG. 2 is partially schematic diagram of precipitation of copper by hydrogen gas.

FIG. 2 shows the same process as FIG. 1 with schematic illustration of the apparatus employed. A charging station 21 includes a mixing vessel to which a solution according to the noted formula is supplied and adjusted. A pressure pump 21 feeds the solution into an oscillating container 23 and thereby increases the pressure to an optimum level for the desired reaction. The oscillating container 23 consists in the example shown of two horizontally arranged pipes 27, 27' which are connected to one another and are positioned oscillatably by supports 28, 28'. A rotating imbalance device 29 sets the oscillating container 23 into a circular or other oscillating movement. Such movements may be circular, elliptical, or linear, whereby a horizontal axis of the container 23 defines bodies of rotation or a vertical plane.

Two heat exchangers 26, 26' facilitate heating or cooling of the oscillating container and its contents. From the oscillating container 23 in which the reaction is carried out in the manner already mentioned, the reaction product is fed to a pressure release vessel 24 and thereafter a decanter 25, in which precipitated copper slurry is separated from the solvent.

Figure 3:
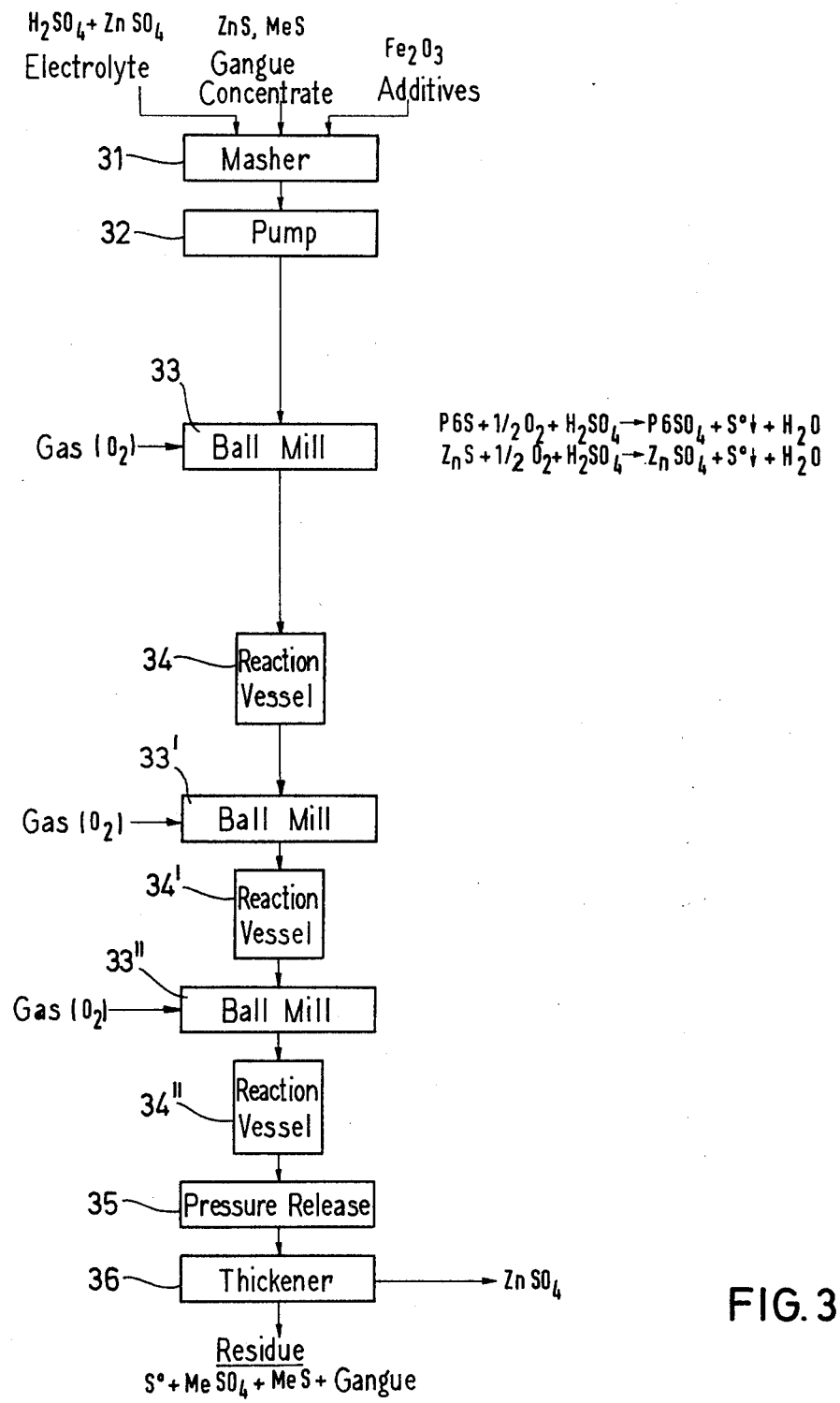
FIG. 3 is a flow diagram showing a process of pressure-leaching of zinc-blend or sphalerite in an electrolyte with oxygen.

FIG. 3 shows in flow diagram form the principles of pressure-lixiviation of zinc-blende or sphalerite. In a mashing station 31 an electrolyte produced on electrolysis is suspended with the concentrate and additives to form a slurry or sludge. In addition, the sludge is preheated directly through introduction of steam or even indirectly by means of heat-exchangers. From the mashing station 31 the sludge enters a pumping station 32. The latter provides a desired pressure and injects the sludge into a first oscillating container 33, which is in the present case, a ball mill.

The ball mill container 33 mixes the aggregate to produce a suspension from the electrolyte, the concentrate, and the injected oxygen. In the mill the ore concentrate is also finely ground as the chemical reaction occurs. The heat of reaction brings the suspension in the mill rapidly to a temperature above the sulphur smelting point. With maintenance of a constant partial pressure of oxygen, the oxygen which is most finely distributed in the electrolyte concentrate mixture is used during the reaction, and then replaced by newly-dissolved oxygen which enters into the reaction. At the same time, the high-energy oscillations induce short-lived compressions and decompressions whereby rapid liquid and material movements, pumping operations, and the like carry off the reacted product. Upon lixiviation above the sulphur smelting point, sulphur particles occurring suspensively go into solution, so that agglomeration thereof with the unleached zinc-blende particles is prevented. In the present case, the mixing and grinding bodies in the mill 33 are iron, preferably since the abrasion and corrosion products of iron are oxidized to ferro- and/or ferri-combinations, which, as known, are catalysts to the zinc-blende leaching operation. The container of the ball-mill itself, which conveniently is merely a pipe is easily protected from corrosion by a lining of synthetic materials, or by forming of the pipe of high-quality steel. Also sealing of the container is easily accomplished, since no rotating parts are employed.

From the ball mill 33, the partially reacted intermediary product reaches a resting or stationary reaction vessel 34. The vessel 34 may be equipped with a stirring or agitation assembly which prevents decomposition of the reaction products. The reaction container 34 may include heat exchangers, not shown, by which the reaction temperature may be maintained. The reaction may then be continued until completed.

Subsequently, the sludge in the reaction container 34 may be cooled to a temperature below the sulphur smelting point and then passed through a second decomposition phase in a second ball mill 33'. The sludges may be passed uncooled into the ball mill 33'. In either case, a comminution of the concentrates takes place, whereby the liquid sulphur-coating is separated from the concentrate and the sulphur passed suspensively into solution. Of course it is of great importance for the entire reaction that a suspension is formed between the oxygen-gas and the sludge which then is activated to attain in the next resting reaction vessel connected in series, an improved degree of reaction. A third stage or step using ball mill 33" and rest vessel 34" is employed similarly.

From the last step in the reaction vessel 34" according to FIG. 3, the sludge passes to pressure release container 35, and from there to a thickener and decanter 36. The latter discharges zinc-sulphate from its overflow while the residue is thickened with the precipitated, elementary sulphur falling out of the suspension. Impure recoverable metals such as lead sulphate and cadmium sulphate, are drawn off in the slurry for further, conventional processing.

Figure 4:
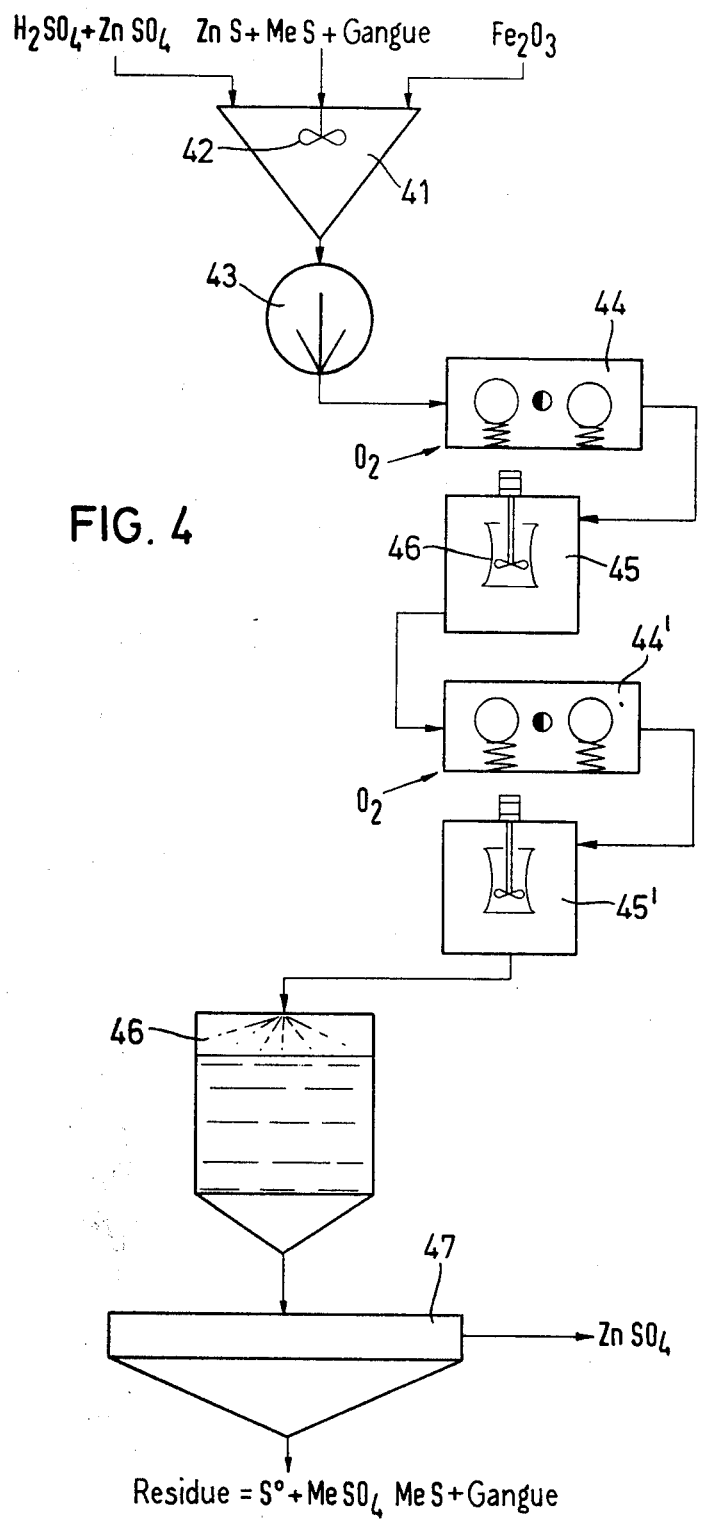
FIG. 4 is a modified flow diagram of FIG. 3 using ball mills and reaction vessels connected in series in two steps.

FIG. 4 shows the same process as in FIG. 3 with schematic illustration of the apparatus employed for a two-step method. A mashing vessel 41 contains an agitator assembly 42. A pumping station 43 feeds into a first ball-mill 44. A reaction vessel 45 has an agitator-assembly 46. A second ball mill 44' passes the sludge to a second reaction container 45', of the same type of construction as 45. From there, the sludge reaches the pressure release container 46 and finally a thickener or decanter 47.

The multiple steps of the invention for pressure-lixiviation of sulfidic substances as in FIGS. 3 and 4 results in an extraordinarily economical process with high output. In each successive step, the quantity of electrolyte and oxygen are increased until the concentrate is almost completely leached.

As an example, in the stepwise leaching of FIG. 3, the lixiviation is carried out in three steps of 15 minutes total leaching time in each step. Thus for leaching and decomposition in each of the oscillating containers 33, 33', and 33", 4½ minutes are to elapse, and 10½ minutes for each stay in the reaction containers 34, 34', and 34". Leaching in the ball mill proceeds at high reaction speeds, whereby the solubility of the zinc has an almost linear increase over time. Upon entry into the resting vessel, the speed of reaction is strongly decreased or stopped through the coating of unreacted blende-particles with the molten sulphur.

Figure 5:
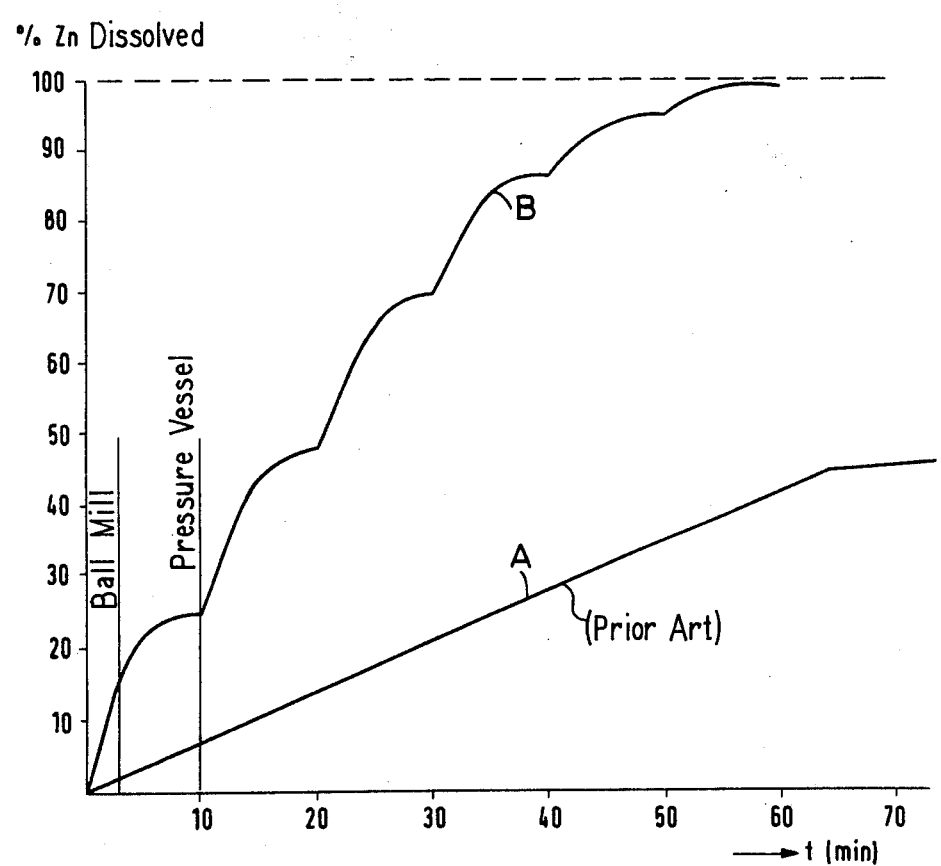
FIG. 5 is a time/concentration graph showing a stepwise leaching using a ball mill and a reaction-vessel, in 6 steps.

These conditions are shown in FIG. 5. Herein, curve A shows results of conventional agitator/auto-clave systems in conducting the reaction below the smelting point of the sulphur. Curve B traces the same reaction using the apparatus and method of the invention as described. The six steps last 10 minutes each in the respective ball mill and reaction-container of each step.

All indicated reactions with participation of gaseous, liquid, or also solid reactants are only given as examples of a plurality of possibilities of utilization of the inventive method in the carrying out of chemical processes. Such fall further within the scope of the invention, as far as they satisfy one of the following claims.

We claim as our invention:

1. The method of conducting a wet metallurgical process on a sulphidic mineral substance with oxygen and sulphuric acid as reactants to form metal sulphates and elemental sulphur which comprises placing the substance and the reactants in an oscillating container having therein freely movable mixing and grinding bodies, heating the contents of the container above the melting point of sulphur, subjecting the container and contents to high energy oscillations which mix the reactants and substance to form a suspension while grinding the substance, whereby the liquid sulphur is separated from the unleached substance particles and fresh reactable mineral substance surfaces are brought into contact with the reactants.

2. The method of claim 1 wherein the mixing and grinding bodies are iron.

3. The method of claim 2 wherein the substance is zinc-blende and the abrasion and corrosion products of the iron are oxidized to ferro or ferri combinations which catalyze the leaching operation.

4. The method of claim 1 wherein the high energy oscillations are at a frequency of at least about 15 Hertz with an amplitude of at least about 8 mm.

5. The method of claim 1 including the added step of transferring the contents of the container to a stationary reaction vessel for continuation of the reactions.

6. The method of claim 5, wherein the contents of the stationary vessel are cooled to a temperature below the melting point of sulphur and transferred to a second oscillating container for repeating the process.

* * * * *